United States Patent [19]
Lee

[11] Patent Number: 6,049,989
[45] Date of Patent: Apr. 18, 2000

[54] THREE-DIMENSIONAL HOMOLOGOUS SURVEYING METHOD AND THE RELATED INSTRUMENT

[76] Inventor: Chiu-Shan Lee, No. 23, Lane 19, Chang-Chun Rd., Hsintien City, Taiwan

[21] Appl. No.: 09/111,726

[22] Filed: Jul. 8, 1998

[51] Int. Cl.⁷ .............................. G01C 17/14; G01C 17/38
[52] U.S. Cl. ...................... 33/355 R; 33/355 D; 33/395; 33/318
[58] Field of Search .............................. 33/318, 319, 321, 33/324, 328–330, 355 R, 351, 352, 354, 355 D, 300, 391, 399, 402, 333, 340–343

[56] References Cited

U.S. PATENT DOCUMENTS

| | | | |
|---|---|---|---|
| 3,949,483 | 4/1976 | White | 33/355 D |
| 4,945,647 | 8/1990 | Beneventano et al. | 33/318 |
| 5,138,771 | 8/1992 | Lee | 33/395 |
| 5,269,065 | 12/1993 | Ida | 33/355 R |
| 5,469,630 | 11/1995 | Lewis | 33/355 R |
| 5,528,837 | 6/1996 | Hartmann et al. | 33/355 R |

Primary Examiner—Diego Gutierrez
Assistant Examiner—Quyen Doan
Attorney, Agent, or Firm—Rosenberg, Klein & Lee

[57] ABSTRACT

A three-dimensional homologous surveying instrument includes a base with an outer spherical shell mounted thereon for receiving therein a ring-shaped shell holder, an intermediate spherical shell and an inner spherical shell with respective zero references at in a homologous relationship with each other. The inner spherical shell rotates within the intermediate spherical shell about X-axis. The intermediate spherical shell rotates within the ring-shaped shell holder about Y-axis. The outer spherical shell is positioned in the base to serve as the X-axis. The inner spherical shell and the intermediate spherical shell each have a pendulum at the bottom. The outer spherical shell, the ring-shaped shell holder, the inner spherical shell and the intermediate spherical shell form a gyroscopic device for three dimensional surveying through X-axis, Y-axis and Z-axis concomitantly. The pendulum of the inner spherical shell is mounted with a compass for indicating the direction of the angle of slope being surveyed.

12 Claims, 13 Drawing Sheets

THREE-DIMENSIONAL HOMOLOGOUS SURVEYING METHOD AND THE RELATED INSTRUMENT

BACKGROUND OF THE INVENTION

The present invention improves the structure of the three-dimensional homologous surveying instrument disclosed in U.S. Pat. No. 5,138,771, enabling the reading of a three-dimensional survey to be quickly read out.

Figure 16:
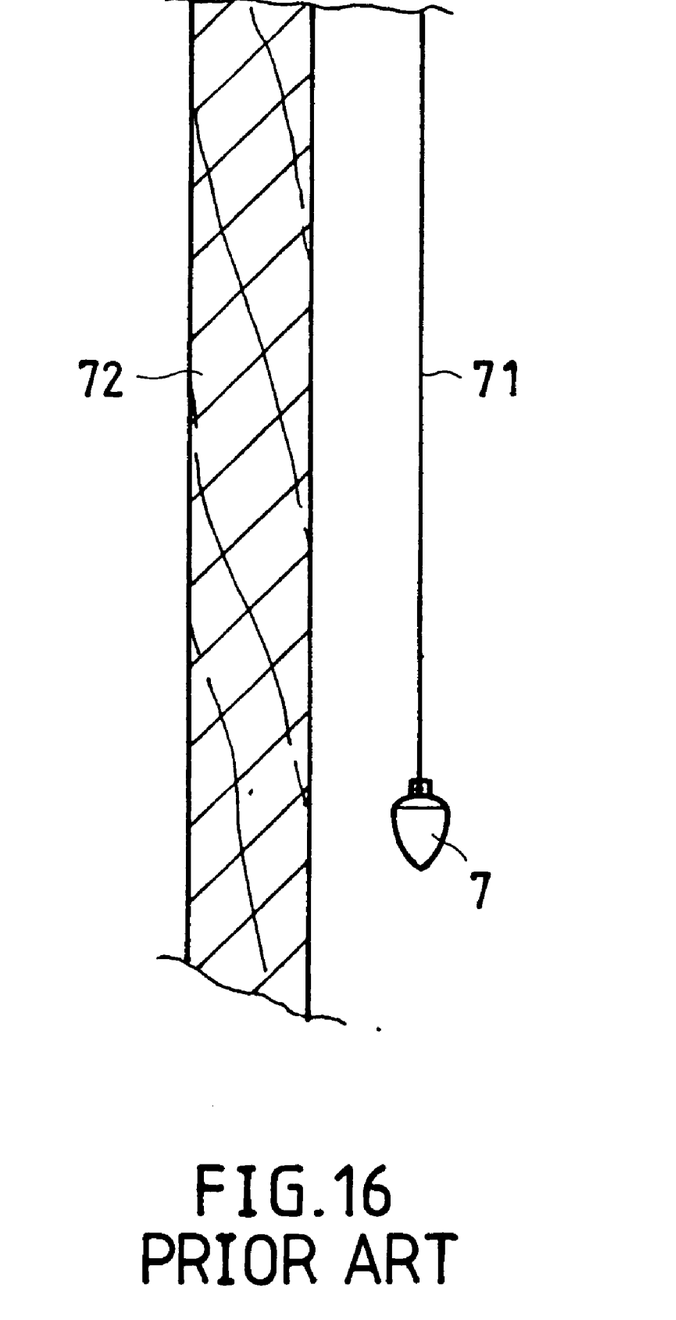
FIG. 16 shows the application of a vertical surveying pendulum according to the prior art.
Figure 17:
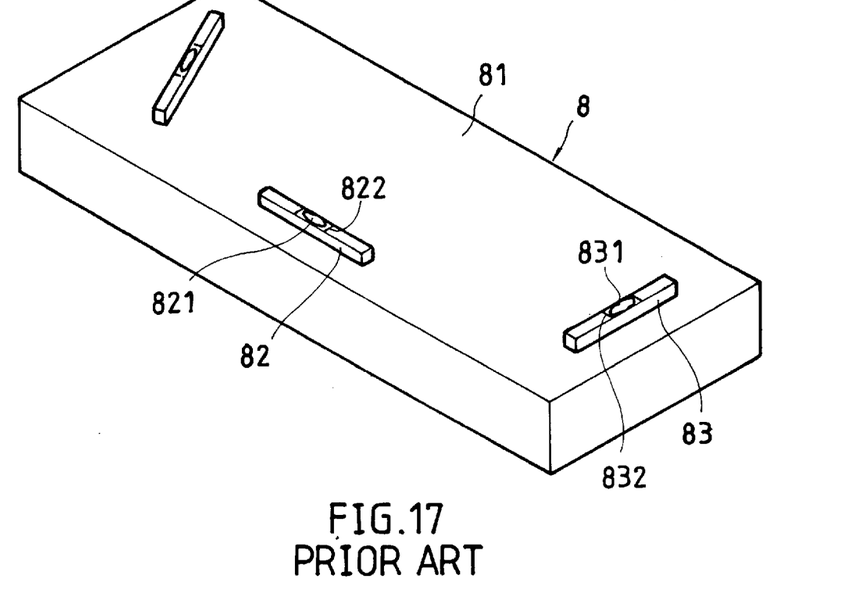
FIG. 17 shows an air bubble tube type surveying instrument set in a horizontal position according to the prior art.
Figure 18:
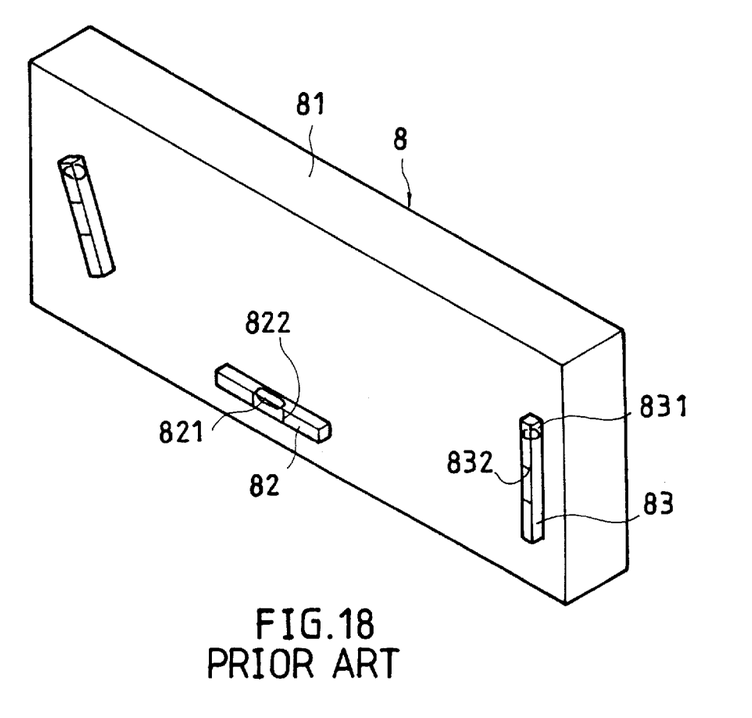
FIG. 18 shows the surveying instrument of FIG. 17 set in a vertical position.

Conventionally for testing the vertical of an object 72 (see FIG. 16), a pendulum 7 is suspended from a cord 71 and moved by hand, and then is released in order to determine and minimize the distance between the object 72 and the pendulum 7. However, it takes the pendulum time to come to a stand still and when it does, the handing line hardly ever gets close enough to the target to be acceptable without repeating the measurement, making the process troublesome and resulting in reading errors as well as time wasted and imprecision. FIGS. 17 and 18 show a surveying instrument according to the prior art. This structure of surveying instrument 8 comprises a base 81, and two glass tubes 82;83 positioned on the base 81 at right angles. The glass tubes 82;83 are marked with reference signs 822;832, and filled with liquid containing air bubbles 821;831, the air bubbles 821;831 seeking the highest point in the tubes 82;83 for horizontal surveying. However, due to the nature of liquid and low sensitivity of air bubbles, accurate precision can not be obtained. Th liquid used is easily affected by weather, which also causes enlargement of the air bubbles. The aforesaid and other known conventional surveying instruments are generally for one-dimension surveys, but they can not indicate the angles through three-dimensional rotation.

SUMMARY OF THE INVENTION

The present invention has been accomplished under the circumstances in view. It is one object of the present invention to provide a three-dimensional homologous surveying instrument which incorporates X-axis, Y-axis and Z-axis into an instrument, enabling scalings to be shown at an inner spherical shell, an intermediate spherical shell and an outer spherical shell for three dimensional surveying through X-axis, Y-axis and Z-axis concomitantly, so that any person who is not skilled in the art can understand the functions of the instrument and use is conveniently. It is another object of the present invention to provide a three-dimensional homologous surveying instrument which has a base that can be conveniently attached to the object to be surveyed, enabling the angle of slope of the object to be quickly measured. It is still another object of the present invention to provide a three-dimensional homologous surveying instrument which is connected with an electronic monitoring circuit assembly for monitoring the sloping condition of a building, construction, etc. It is still another object of the present invention to provide a three-dimensional homologous surveying instrument which is equipped with a compass for indicating the direction of the angle of slope of an object. It is still another object of the present invention to provide a three-dimensional homologous surveying instrument which can be used for calibrating any of a variety of surveying instrument as well as for helping students learn the concept of X, Y, Z three dimensions, vertical, plane and slopes.

According to one embodiment of the present invention, the three-dimensional homologous surveying instrument is comprised of a base, an outer spherical shell mounted in the base, a ring-shaped shell holder turned about an axis within the outer spherical shell, an intermediate spherical shell turned about an axis within the ring-shaped shell holder, and an inner spherical shell turned about an axis within the intermediate spherical shell. The inner spherical shell represents the X-axis. The lower half of the inner spherical shell is a pendulum. The center of the upper half of the inner spherical shell is marked with a zero reference. The inner spherical shell is rotated on the X-axis. When the inner spherical shell stands still, the zero reference of the inner spherical shell coincides with X0° of the X-axis. The intermediate spherical shell represents the Y-axis. The lower half of the intermediate spherical shell is a pendulum. The center of the upper half of the intermediate shell is provided with a zero reference hole. The intermediate spherical shell is rotated on the Y-axis. When the intermediate spherical shell stands still, the zero reference hole of the intermediate spherical shell coincides with Y0° of the Y-axis. The inner spherical shell and the intermediate spherical shell provide two-dimension plane factors, i.e., X0°+Y0°. The outer spherical shell represents the Z-axis. The outer spherical shell is marked with a Z-axis zero reference and scalings. Through the zero reference (Z0°) and scalings on the outer spherical shell, the zero reference hole (Y0°) and scalings on the intermediate shell and the zero reference (X0°) and scalings oil the inner spherical shell, the instrument is used to survey the horizontal status or the angle of slope (X0°+Y0°+Z5°) of an object. By increasing the number of spherical shells and enabling the spherical shells to be rotated on respective axes in different directions with one receiving inside another, readings on different axial tracks can be obtained. The Z-axis of the outer spherical shell is on the plane of the X-axis of the inner spherical shell and the Y-axis of the intermediate spherical shell. The Z-axis can be surveyed on the X-axis through 360°) as well as on the Y-axis through 360°. X0° can be calibrated on the X-axis track. Y0° can be calibrated on the Y-axis track. X0°+Y0° form a plane relative to the Z-axis of the outer spherical shell. Therefore, the dynamic X-axis, Y-axis and Z-axis form a gyroscopic device for three dimensional surveying through X-axis, Y-axis and Z-axis concomitantly.

DETAILED DESCRIPTION OF THE PREFERRED EMBODIMENT

Referring to FIGS., 1, 2, 3, 4 and 9, an inner spherical shell 4 and an intermediate spherical shell 3 are positioned inside a ring-shaped shell holder 2 by positioning pins 45;36 in such a manner that the inner spherical shell 4 can be rotated about the X-axis within the intermediate spherical shell 3, the intermediate spherical shell 3 can be rotated about the Y-axis within the ring-shaped shell holder 2. The inner spherical shell 4 and the intermediate spherical shell 3, like tumblers have respective lower halves heavier than respective upper halves. The ring-shaped shell holder 2 is positioned inside an outer spherical shell 1 by positioning pins 21. The positioning pins 21 of the ring-shaped shell holder 2 are respectively inserted in opposite pivot holes 13 on the outer spherical shell 1. The axis which passes through the positioning pins 21 at the ring-shaped shell holder 2 is perpendicular to the axis which passes through the positioning pins 36 at the intermediate spherical shell 3. The outer spherical shell 1 is mounted on a base 5. The intermediate spherical shell 3 has a zero reference hole 32. The outer spherical shell 1 and the inner spherical shell 4 are marked with a respective zero reference 11;42. Because the inner spherical shell 4 and the intermediate spherical shell 3 can be synchronously swung within the outer spherical shell 1, and are respectively rotated about the X-axis and the Y-axis, the inner spherical shell 4, the intermediate spherical shell 3 and the outer spherical shell 1 form an instrument (or surveying angles on the X-axis and the Y-axis within 360°. Further, by means of a compass 445 inside the inner spherical shell 4 and the scaling on the base 5, the instrument can also survey a tilting angle and its direction. The inner spherical shell 4 is comprised of a top shell 41, a hemispherical bottom shell 44, and a pendulum 443 mounted within the hemispherical bottom shell 44. The top shell 41 is marked with 45° angle scaling 43 and other scalings 431. The zero reference 42 is marked at the top center of the top shell 41. The positioning pins 45 are integral with the outside wall of the top shell 41 near the bottom at two opposite sides and inserted into opposite pivot holes 23 on the ring-shaped shell holder 2. The compass 445 is mounted on the flat top side wall of the pendulum 443. The pendulum 443 is free from the effect of magnetic field. The hemispherical bottom shell 44 has a plurality of retaining notches 441 equiangularly spaced around the peripheral edge thereof for the positioning of the top shell 41. The intermediate spherical shell 3 receives the inner spherical shell 4 on the inside, and is comprised of a bottom shell 37 and a top shell 31. The bottom shell 37 is a pendulum, which is free from the effect of magnetic field, and has a plurality of retaining notches 371 equiangularly spaced around the peripheral edge thereof for the positioning of the top shell 35. The top shell 31 comprises a 45° reference hole 32, a scalings 34, and symmetrical peep slots 33 through which the readings on the inner spherical shell 4 are viewed. The zero reference hole 32 is provided the top center of the top shell 31. The positioning pins 36 are integral with the outside wall of the top shell 31 near the bottom at two opposite sides. The axis which passes through the positioning pins 36 is perpendicular to the axis which passes through the positioning pins 45. When the inner spherical shell 4 is mounted within the intermediate spherical shell 3 and the intermediate spherical shell 3 is mounted within the ring-shaped shell holder 2, the inner spherical shell 4 and the intermediately spherical shell 3 are permitted to rotate on the X-axis and the Y-axis respectively, the zero reference 42 and the zero reference hole 32 are maintained at the top. The positioning pins 21 of the ring-shaped shell holder 2 are pivotably coupled to the outer spherical shell 1 (Z-axis), permitting the ring-shaped shell holder 2 to be forced by the pendulums 443;37 to swing with the inner spherical shell 4 and the intermediate spherical shell 3 in the X-axis direction. Further, the pendulums 443;37 have a respective transverse screw hole 444 or 372, and a respectively adjustment screw 444 or 373 threaded into the transverse screw hole 444 or 372. The adjustment screw 4441 or 373 serves as a counterweight and is turned in the respective transverse screw hole 444 or 372 to change the location of the center of gravity of the shell 4 or 3, enabling the zero readings of the X-axis, the Y-axis and the Z-axis to be coincide with one another. The axis which passes through the transverse screw hole 444 on the inner spherical shell 4 is perpendicular to the transverse screw hole 372 which passes through the intermediate spherical shell 3. Because the inner spherical shell 4, the intermediate spherical shell 3 and the ring-shaped shell holder 2 are permitted to rotate on the X-axis, the Y-axis and the Z-axis respectively, the device is formed for three dimensional surveying through X-axis, Y-axis and Z-axis concomitantly.

Figure 1:
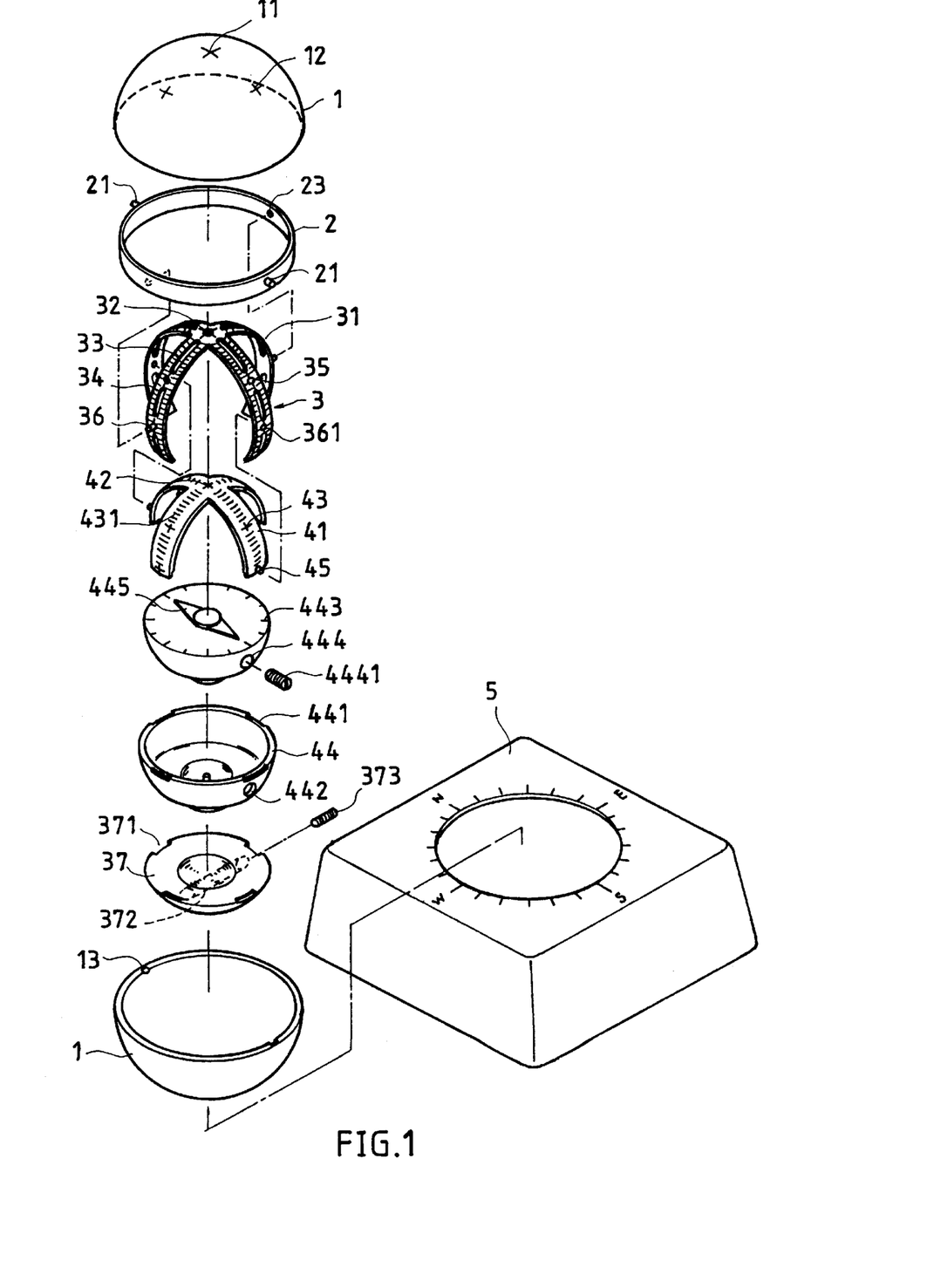
FIG. 1 is a exploded view of a three-dimensional homologous surveying instrument according to a first embodiment of the present invention.
Figure 2:
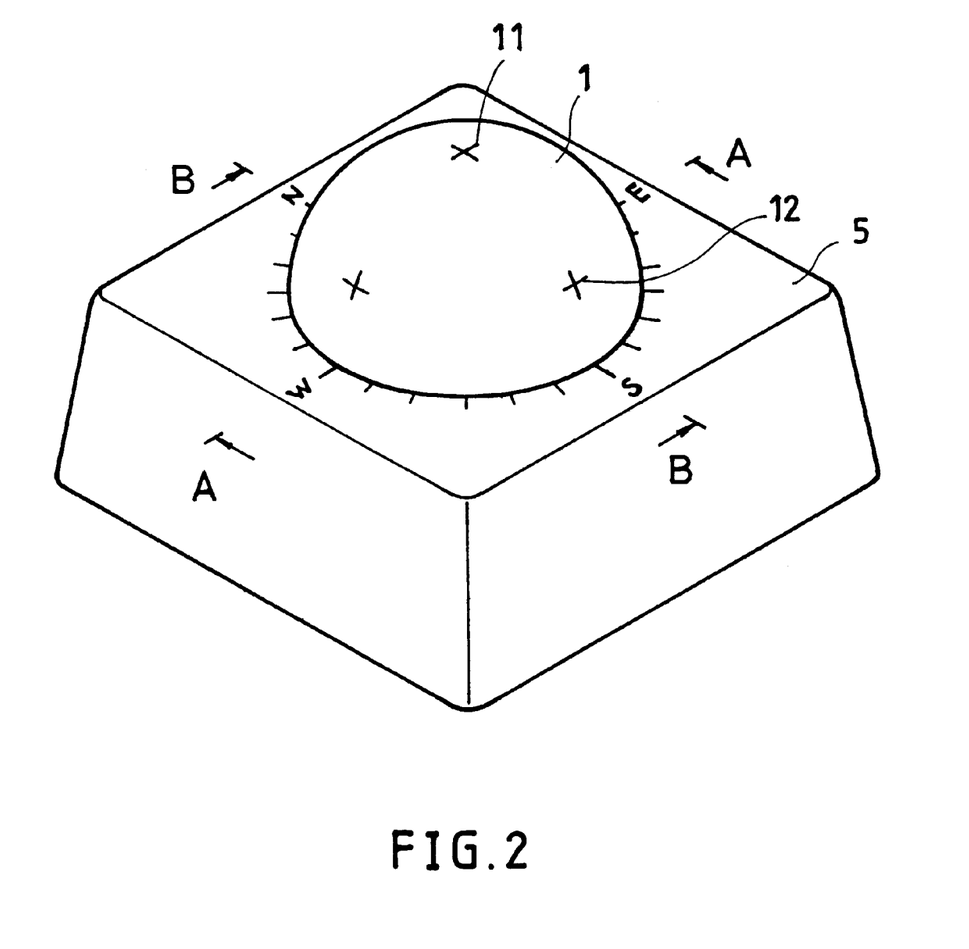
FIG. 2 is a perspective view of the three-dimensional homologous surveying instrument shown in FIG. 1.
Figure 3:
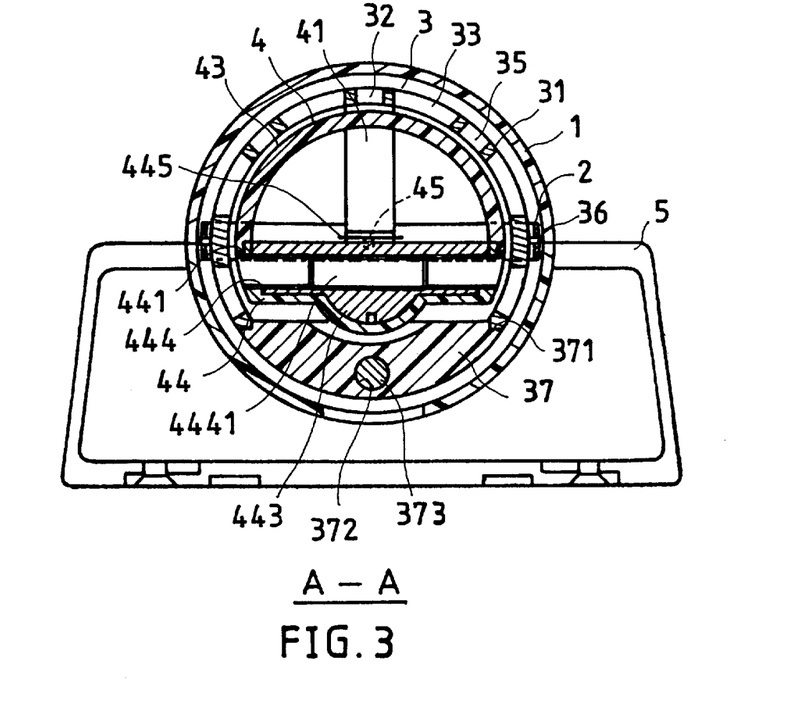
FIG. 3 is a sectional view taken along line A—A (X-axis) of FIG. 2.
Figure 3A:
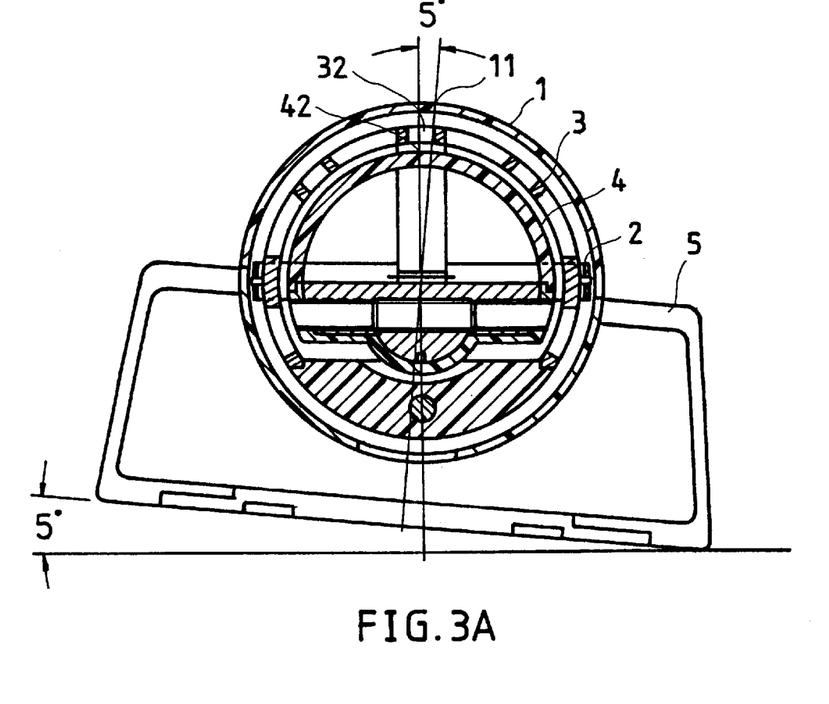
FIG. 3A shows the instrument slopped at 5° angle in X-axis direction.
Figures 3B, 5A:
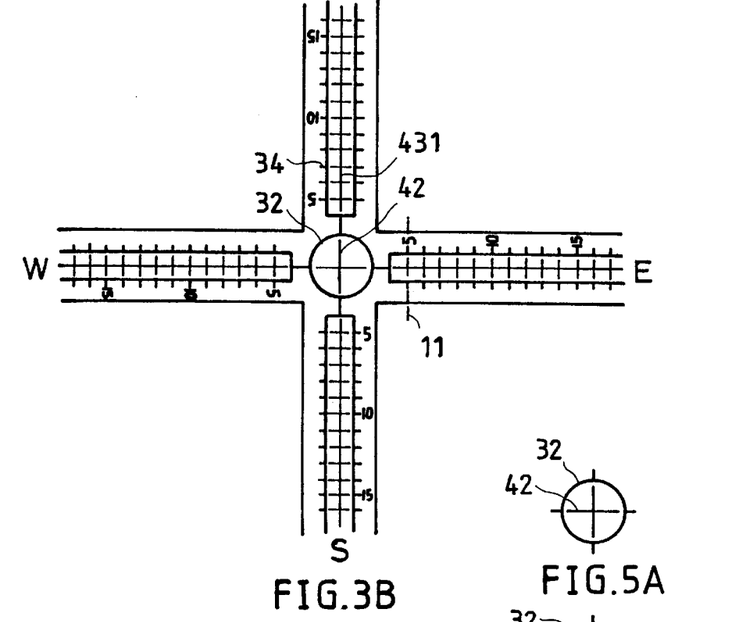
FIG. 3B shows the relation of the scalings when at the position of FIG. 3A.
FIG. 5A shows the zero reference of the inner spherical shell aligned with the zero reference hole on the intermediate spherical shell when the instrument is retained in a sloping position.
Figure 4:
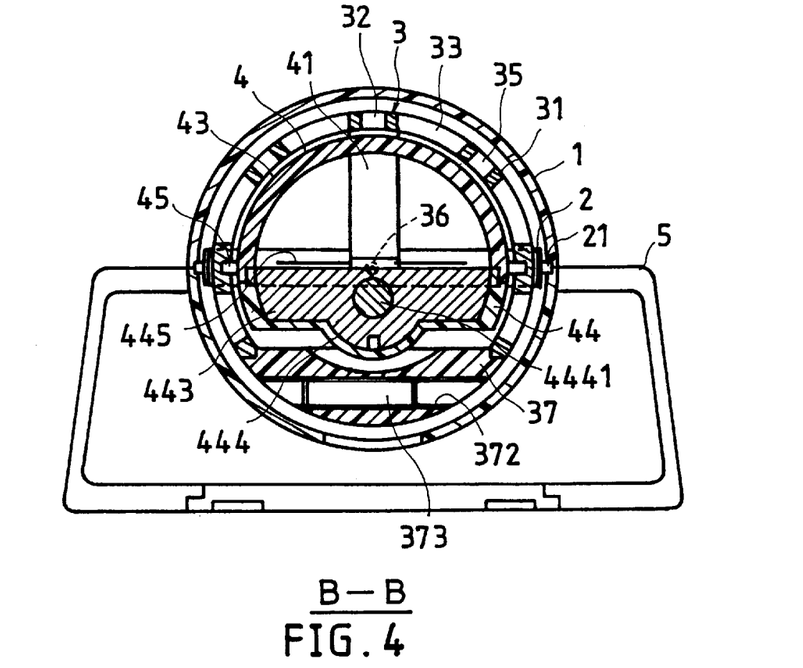
FIG. 4 is a sectional view taken along line B—B (Y-axis) of FIG. 2.
Figure 4A:
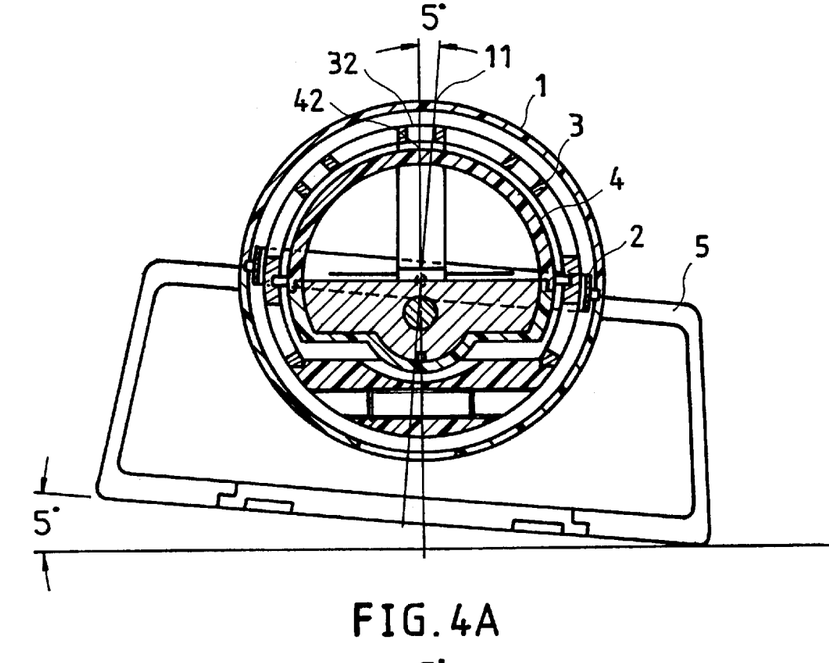
FIG. 4A shows the instrument slopped at 5° angle in Y-axis direction.
Figures 4B, 5:
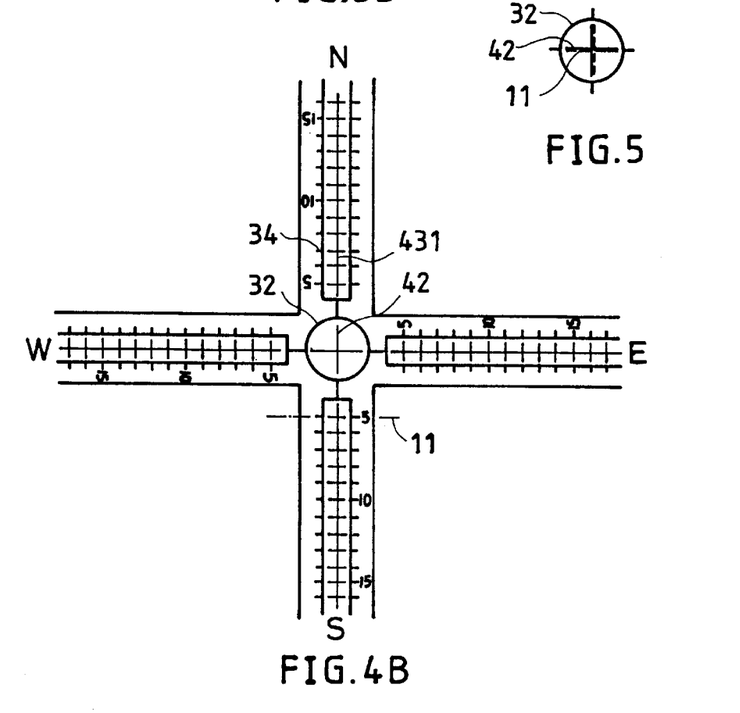
FIG. 4B shows the relation of the scalings when at the position of FIG. 4A.
FIG. 5 shows the zero references of the outer spherical shell and inner spherical shell aligned with the zero reference hole of the intermediate spherical shell when the instrument is maintained in horizontal.

Referring to FIGS. 3A, 3B, 4A, 4B, 5 and 5A, when the object to be surveyed is inclined at 5° leftwards or rightwards, the zero reference 42 of the inner spherical shell 4 is aimed at the center of the zero reference hole 32 of the intermediate spherical shell 3, and the zero reference 11 of the outer spherical shell 1 is moved to 5° leftwards or rightwards from the zero reference hole 32 of the intermediate spherical shell 3 (i.e., the zero reference of Z-axis is indicated at XX axis by X0°+Y0°Z5°, as shown in FIG. 3B). When the object to be surveyed is inclined 5° 2 forwards or backwards, the zero reference 42 of the inner spherical shell 4 is aimed at the center of the zero reference hole 32 of the intermediate spherical shell 3, and the zero reference 11 of the outer spherical shell 1 is moved to 5° above or below the zero reference hole 32 of the intermediate spherical shell 3 (i.e., the zero reference of Z-axis is indicated at YY axis by X0°+Y0°Z5°, as shown in FIG. 3B; see FIG. 4B). As indicated in FIGS. 3B and 4B, the zero reference 42 and sealing 431 of X-axis are moved with the inner spherical shell, and can be viewed through the zero reference hole 32 and peep slots 33, enabling the position of Z-axis to be easily read out. If the object to be surveyed is not maintained in horizontal, the zero reference 42 is aimed at the center of the zero reference hole 32, but biased from the zero reference 11 of the outer spherical shell 1 (i.e., X0°+Y0°, as shown in FIG. 5A). When the object is maintained in horizontal, the zero reference 42 of the inner spherical shell 4 is aimed at the center of the zero reference hole 32 on the intermediate spherical shell 3, and the zero reference 11 of the outer spherical shell 1 is in alignment with the zero reference hole 32 on the intermediate spherical shell 3 and the zero reference 42 of the inner spherical shell 4 (i.e., X0°+Y0°+Z0°, as shown in FIG. 5).

Figure 6:
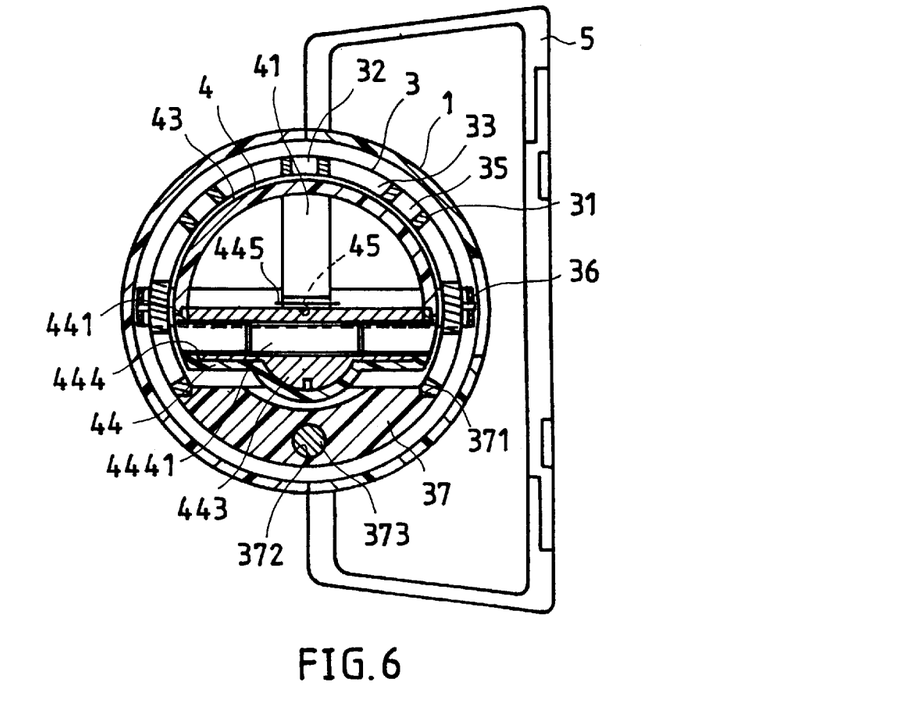
FIG. 6 is a sectional view of the present invention showing the instrument retained in vertical in X-axis direction.
Figure 7:
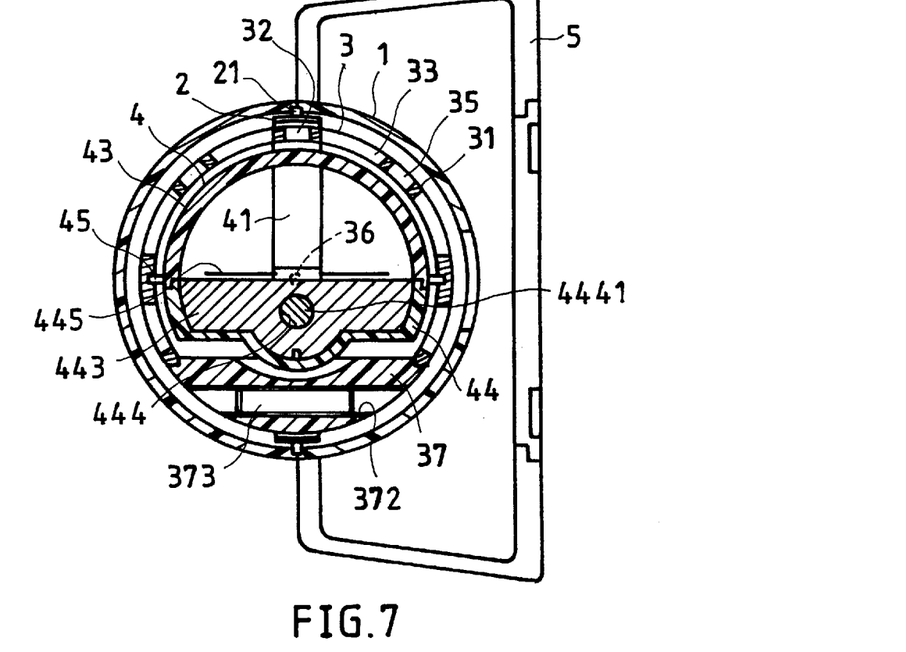
FIG. 7 is a sectional view of the present invention showing the instrument retained in vertical in Y-axis direction.

Referring to FIGS. 6 and 7, if the object to be surveyed is maintained in a vertical position in X-axis direction, the zero reference 42 of the inner spherical shell 4 is aimed at the center of the zero reference hole 32 on the intermediate spherical shell 3, the zero reference 11 of the outer spherical shell 1 is moved to 9° leftwards or rightwards from the zero reference hole 32 on the intermediate spherical shell 3 (see FIG. 6). If the object to be surveyed is maintained in a vertical position in Y-axis direction, the zero reference 42 of the inner spherical shell 4 is aimed at the center of the zero reference hole 32 on the intermediate spherical shell 3. The zero reference 11 of the outer spherical shell 1 is moved to 90° forwards or backwards from the zero reference hole 32 on the intermediate spherical shell 3 (see FIG. 7).

Figure 8:
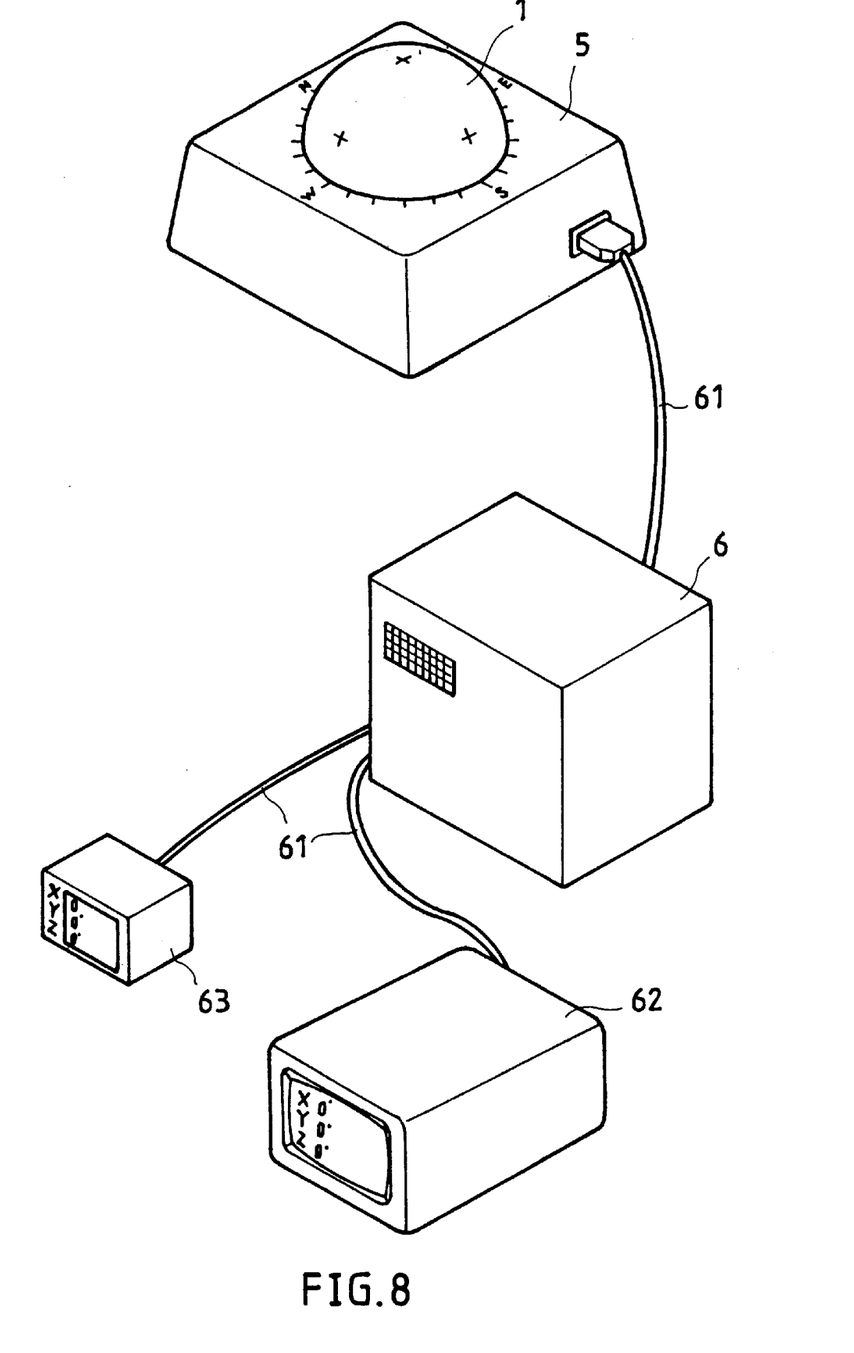
FIG. 8 shows an analog-to-digital converter connected to the instrument, a digital display and a monitor respectively connected to the analog-to-digital converter according to the present invention.
Figure 9:
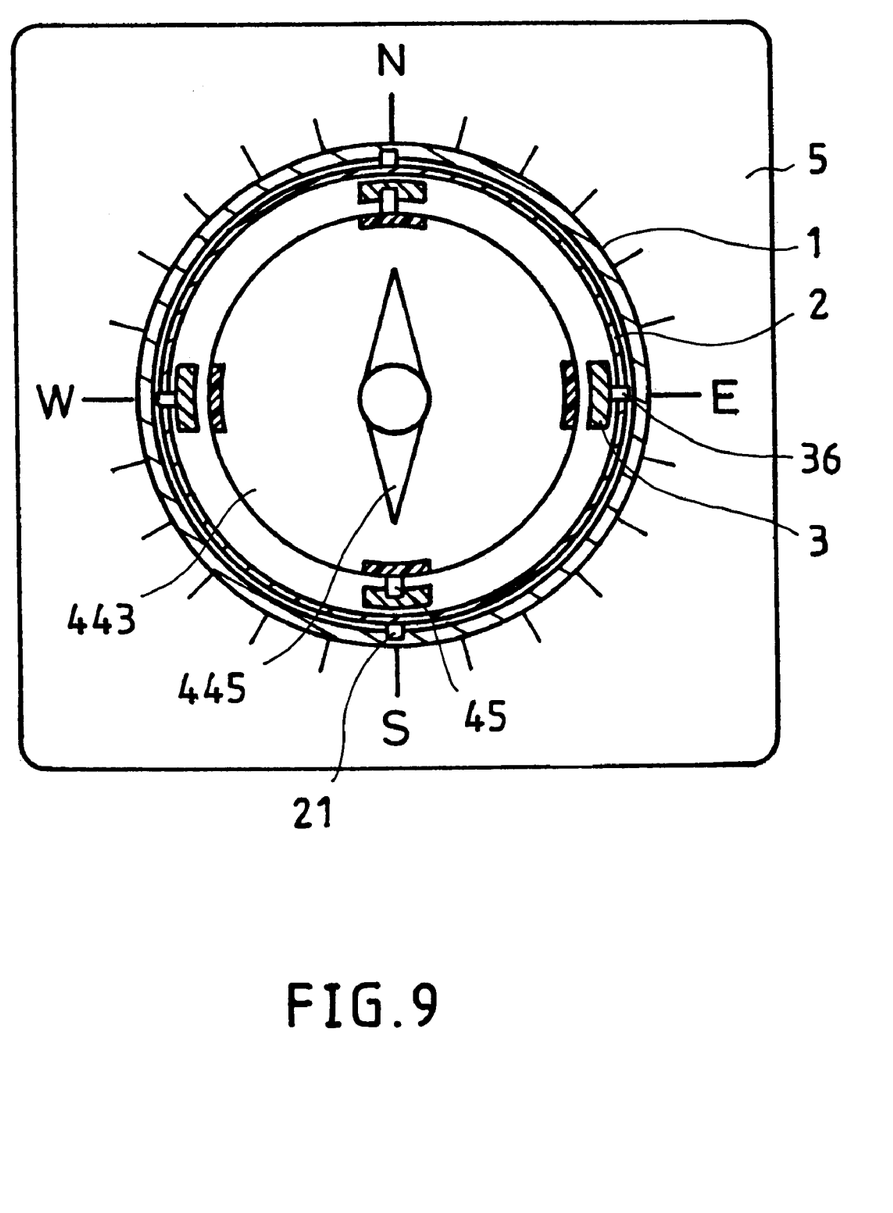
FIG. 9 is a top plain view showing the indication of the compass according to the present invention.

Referring to FIGS. 8 and 9, detectors (not shown) may be installed in the surveying instrument to detect the angles of rotation of the positioning pins 21;36;45 respectively. Detected analog data from the detectors are converted into respective digital data by an analog-to-digital converter 6. and then shown through a digital display 63 or a monitor 62. Signal lines 61 are provided to connect the digital display 63, the monitor 62, the analog-to-digital converter 6 and the detectors together.

Figure 10:
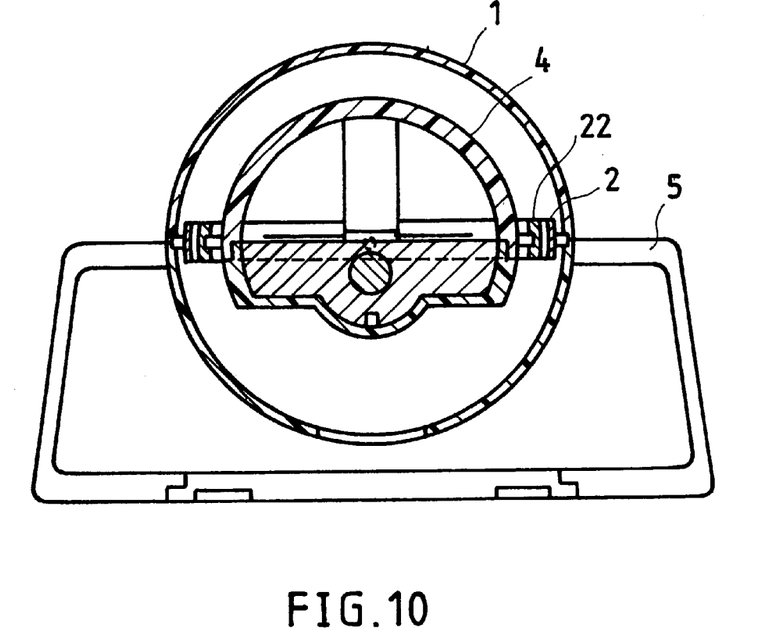
FIG. 10 is a sectional view of a three-dimensional homologous surveying instrument according to a second embodiment of the present invention.
Figure 11:
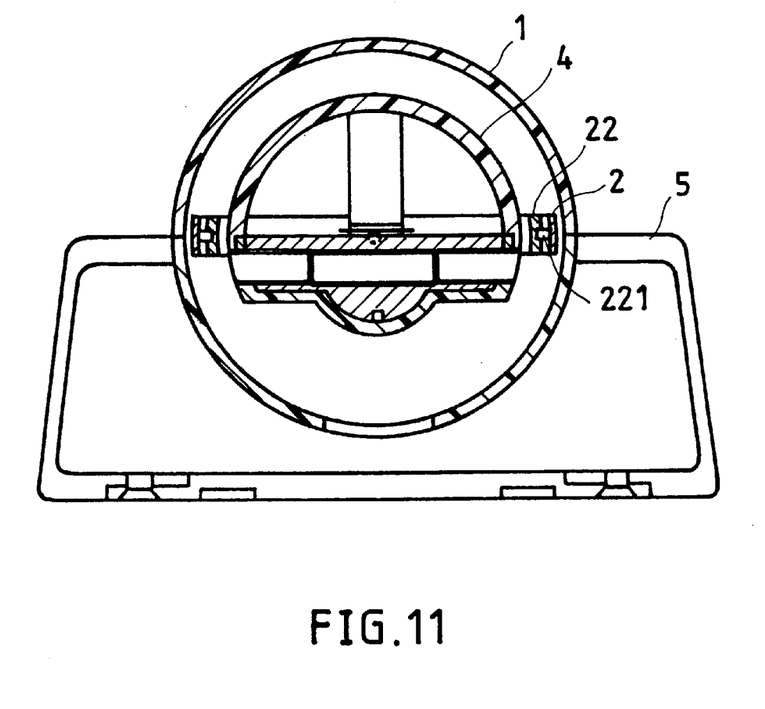
FIG. 11 is another sectional view of the second embodiment of the present invention.

FIGS. 10 and 11 show a second embodiment of the 3-D homologous surveying instrument of the present invention. According to this embodiment, the aforesaid intermediate spherical shell 3 is placed by a second ring-shaped shell holder 22. The second ring-shaped shell holder 22 is pivotably mounted within the ring-shaped shell holder 22 by positioning pins 221, and rotated on the Y-axis.

Figure 12:
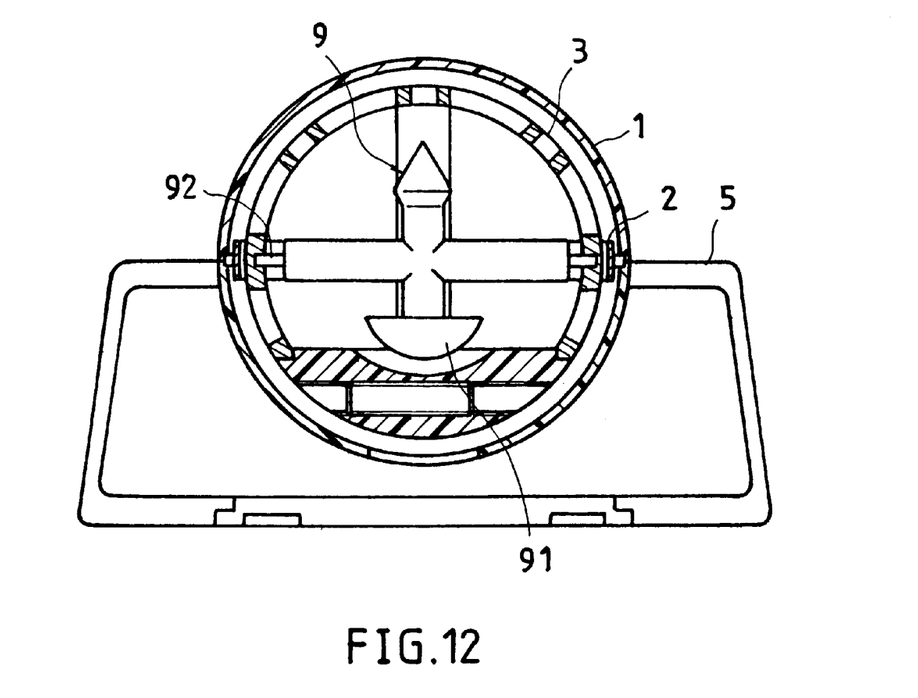
FIG. 12 is a sectional view of a three-dimensional homologous surveying instrument according to a third embodiment of the present invention.
Figure 13:
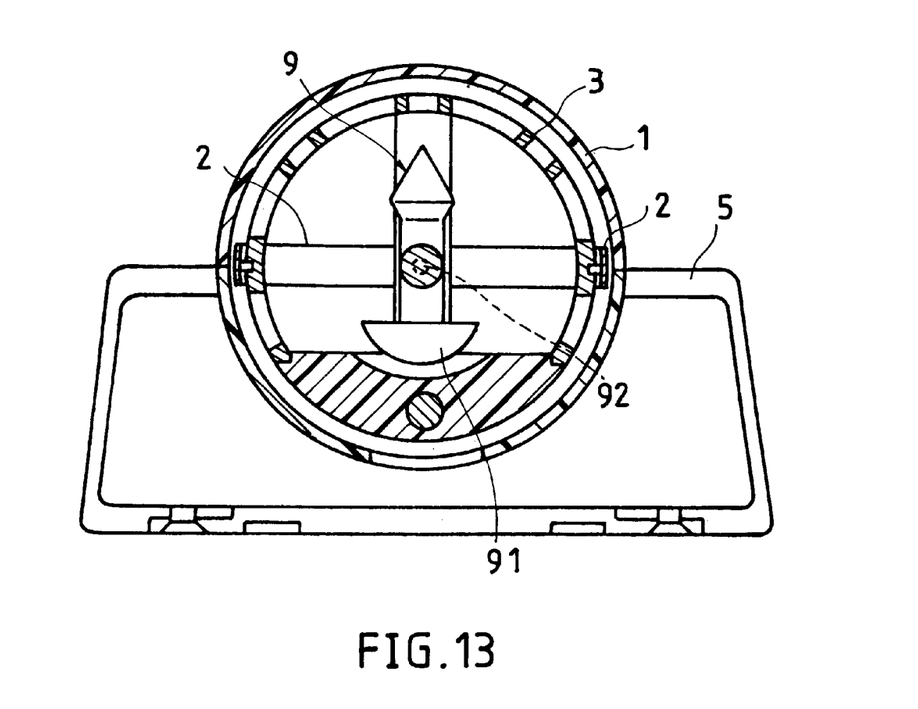
FIG. 13 is another sectional view of the third embodiment of the present invention.

FIGS. 12 and 13 show a third embodiment of the 3-D homologous surveying instrument of the present invention. According to this embodiment, the aforesaid inner spherical shell 4 is replaced by an index 9. The index 9 is pivotably mounted within the termedate spherical shell 3 by positioning pins 92 and turned about the X-axis, having one end integral with a pendulum 91. Therefore, through the outer spherical shell 1 (Z-axis), the intermediate spherical shell 3 (Y-axis) and the index 9 (X-axis), it can be immediately judged if an object is at a horizontal or inclined status.

Figure 14:
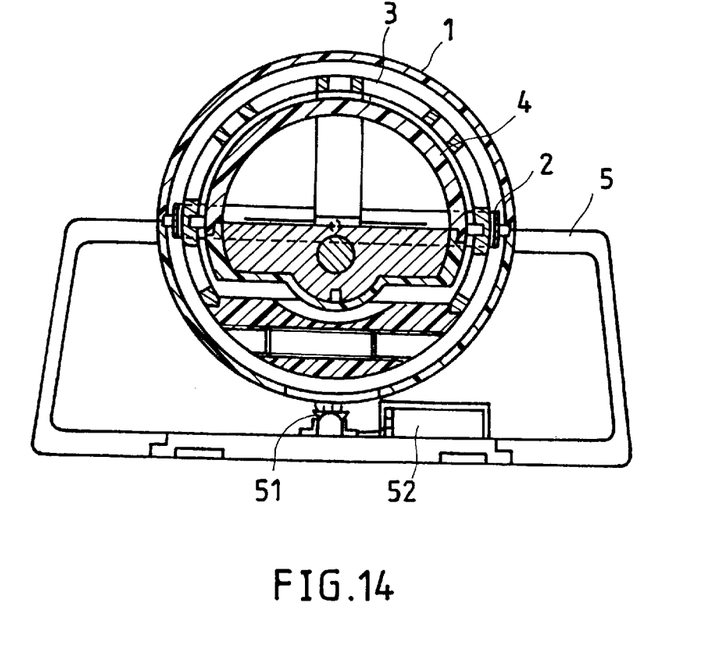
FIG. 14 is a sectional view of a three-dimensional homologous surveying instrument according to a fourth embodiment of the present invention.

FIG. 14 shows a fourth embodiment of the 3-D homologous surveying instrument of the present invention. According to this embodiment, a light source 51 and a battery cell 52 are mounted inside the base 5 below the outer spherical shell 1, the outer spherical shell 1, the intermediate spherical shell 2 and the inner spherical shell 4 are transparent. The battery cell 52 provides the necessary working voltage to the light source 51. The light source 51 emits light through the shells 1;2;4, enabling the user to view the readings of the instrument at night.

Figure 15:
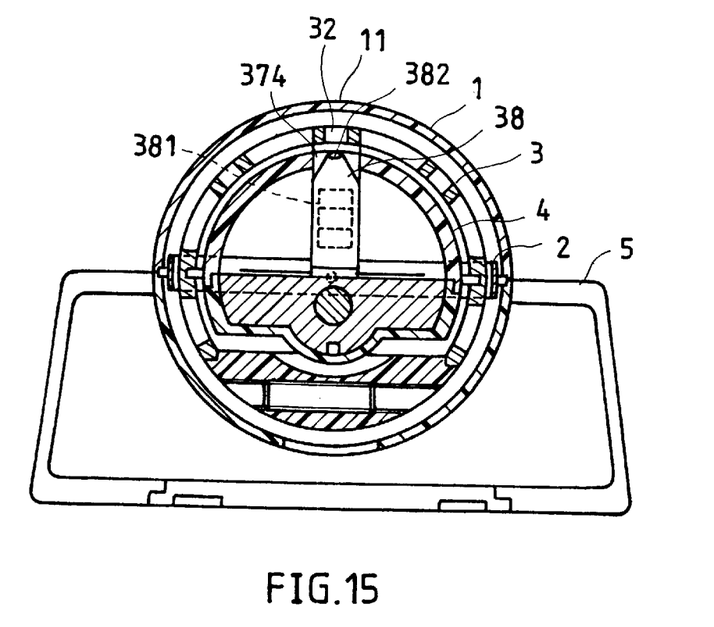
FIG. 15 is a sectional view of a three-dimensional homologous surveying instrument according to a fifth embodiment of the present invention.

FIG. 15 showvs a filth embodiment of the 3-D homologous surveying instrument of the present invention. According to this embodiment, a battery 381 and a laser beam generating module 38 are connected together and mounted in the inner spherical shell. The laser beam generating module 38 has a laser firing hole 382 retained in coincidence with the top center hole 374 of the inner spherical shell 4. The laser beam generating module 38 emits a laser beam through the laser firing hole 382 for X-axis zero reference.

As indicated above, the present invention provides a 3-D homologous surveying instrument which enables the user to rapidly accurately survey the horizontal or inclined status of an object. According to the present invention, the instrument forms a gyroscopic device for three dimensional surveying through X-axis, Y-axis and Z-axis concomitantly.

What the invention claimed is:

1. A three-dimensional homologous surveying method comprising the steps of:

a) preparing an inner spherical shell having a heavier lower half and a lighter upper half, an intermediate spherical shell having a heavier lower half and a lighter upper half, a ring-shaped shell holder, and a transparent outer spherical shell;

b) making a zero reference at the center of an upper half of said outer spherical shell, a zero reference hole at the center of the upper half of said intermediate spherical shell, a zero reference at the center of the upper half of said inner spherical shell, and scalings on said inner spherical shell, said intermediate spherical shell and said outer spherical shell;

c) fixedly mounting a compass on the lower half of said inner spherical shell; and d) positioning said inner spherical shell to rotate within said intermediate spherical shell about X-axis positioning said intermediate spherical shell to rotate within said ring-shaped shell holder about Y-axis, and positioning said ring-shaped shell holder to rotate within said outer spherical shell about Z-axis, enabling inner spherical shell, said intermediate spherical shell, said ring-shaped shell holder and said outer spherical shell to form a gyroscopic device for three dimensional surveying through X-axis, Y-axis and Z-axis concomitantly, and enabling said compass to indicate the direction of angle surveyed.

2. A three-dimensional homologous surveying instrument comprising:

an inner spherical shell, said inner spherical shell comprising a top shell, a hemispherical bottom shell, and a pendulum free from the effect of magnetic field and mounted within the hemispherical bottom shell, the top shell of said inner spherical shell being marked with a zero reference at the center thereof and scalings, the top shell of said inner spherical shell comprising two positioning pins raised from the periphery at two opposite sides adjacent to the hemispherical bottom shell, the pendulum of said inner spherical shell comprising a flat top side wall, a compass mounted in said flat top side wall, a transverse through hole, a counterweight adjustment screw threaded into said transverse through hole and turned to change the location of the center of gravity of the pendulum of said inner spherical shell and to adjust zero reading of the X-axis;

an intermediate spherical shell which receives said inner spherical shell, said intermediate spherical shell comprised of a bottom shell and a top shell, the bottom shell of said intermediate spherical shell being a pendulum free from the effect of magnetic field and having a transverse screw hole and a counterweight adjustment screw threaded into the transverse screw hole and turned to change the location of the center of gravity of the bottom shell of said intermediate spherical shell and to adjust zero reading of the Y-axis, the top shell of said intermediate spherical shell comprising a zero reference hole at the center thereof, scalings, symmetrical peep slots through which the scalings on said inner spherical shell being viewed, two positioning pins raised from the peripheral at two opposite sides adjacent to the bottom shell of said intermediate spherical shell, and two pivot holes at two opposite sides adjacent to the bottom shell of said intermediate spherical shell which receive the positioning pins of said inner spherical shell, the axis which passes through the pivot holes on said intermediate spherical shell being perpendicular to the axis which passes through the positioning pins of said intermediate spherical shell;

a ring-shaped shell holder mounted around said intermediate spherical shell, said ring-shaped shell holder having two opposite positioning pins, and two opposite pivot holes which receive the positioning pins of said intermediate spherical shell, the axis which passes through the pivot holes on said ring-shaped shell holder being perpendicular to the axis which passes through the positioning pins of said ring-shaped shell holder;

an outer shell formed of all upper hemispherical shell and a lower hemispherical shell fastened together and fixedly mounted in the circular center hole on said base, said outer shell having a Z-axis zero reference at the center of the upper hemispherical shell thereof, crossed scalings on the upper hemispherical shell thereof, and two opposite pivot holes at the connecting area between the upper hemispherical shell and lower hemispherical shell of said cover shell which receive the positioning pins of said ring-shaped shell holder; and a hollow base covered with a bottom cover, said base having a circular center hole at a top side thereof.

3. The three-dimensional homologous surveying instrument of claim 2 further comprising a plurality of detectors respectively installed in the positioning pins of said ring-shaped shell holder, the positioning pins of said intermediate spherical shell and the positioning pins of said inner spherical shell to detect angular displacement of the X-axis, Y-axis and Z-axis, an analog-to-digital converter which converts detected data from said detectors into corresponding digital data, and display means which shows digital data outputted from said analog-to-digital converter.

4. The three-dimensional homologous surveying instrument of claim 2 wherein said outer shell is transparent; said inner spherical shell and said intermediate spherical shell and said ring-shaped shell holder are colored with different colors and made of metal which is free from the effect of magnetic field.

5. A three-dimensional homologous surveying instrument comprising:

an inner spherical shell, said inner spherical shell comprising a top shell, a hemispherical bottom shell, and a pendulum free from the effect of magnetic field and mounted within the hemispherical bottom shell, the top shell of said inner spherical shell being marked with a zero reference at the center thereof and scalings, the top shell of said inner spherical shell comprising two positioning pins raised from the periphery at two opposite sides adjacent to the hemispherical bottom shell, the pendulum of said inner spherical shell comprising a flat top side wall, a compass mounted in said flat top side wall, a transverse through hole, a counterweight adjustment screw threaded into said transverse through hole and turned to change the location of the center of gravity of the pendulum of said inner spherical shell and to adjust zero reading of the X-axis;

a first ring-shaped shell holder mounted around said inner spherical shell, said ring-shaped shell holder having two opposite positioning pins, and two opposite pivot holes, the axis which passes through the pivot holes on said ring-shaped shell holder being perpendicular to the axis which passes through the positioning pins of said ring-shaped shell holder;

a second ring-shaped shell holder mounted around said inner spherical shell within said first ring-shaped shell holder, said second ring-shaped shell holder having two opposite pivot holes which receive the positioning pins of said inner spherical shell, and two opposite positioning pins which are respectively inserted into the pivot holes on said first ring-shaped shell holder, the axis which passes through the pivot holes on said second ring-shaped shell holder being perpendicular to the axis which passes through the positioning pins of said second ring-shaped shell holder;

an outer shell formed of an upper hemispherical shell and a lower hemispherical shell fastened together and fixedly mounted in the circular center hole on said base, said outer shell having a Z-axis zero reference at the center of the upper hemispherical shell thereof, crossed scalings on the upper hemispherical shell thereof, and two opposite pivot holes at the connecting area between the upper hemispherical shell and lower hemispherical shell of said cover shell which receive the positioning pins of said ring-shaped shell holder; and a hollow base covered with a bottom cover, said base having a circular center hole at a top side thereof.

6. A three-dimensional homologous surveying instrument comprising:

a pendulum index turned about the X-axis, said pendulum index comprising two positioning pins raised from two opposite sides thereof on the middles and a bottom end integral with a pendulum an intermediate spherical shell mounted around said pendulum index, said intermediate spherical shell comprised of a bottom shell and a top shell, the bottom shell of said intermediate spherical shell being a pendulum free from the effect of magnetic field and having a transverse screw hole and a counterweight adjustment screw threaded into the transverse screw hole and turned to change the location of the center of gravity of the bottom shell of said intermediate spherical shell and to adjust zero reading of the Y-axis, the top shell of said intermediate spherical shell comprising a zero reference hole at the center thereof, scalings, symmetrical peep slots through which the scalings on said inner spherical shell being viewed, two positioning pins raised from the peripheral at two opposite sides adjacent to the bottom shell of said intermediate spherical shell, and two pivot holes at two opposite sides adjacent to the bottom shell of said intermediate spherical shell which receive the positioning pins of said pendulum index, the axis which passes through the pivot holes on said intermediate spherical shell being perpendicular to the axis which passes through the positioning pins of said intermediate spherical shell;

a ring-shaped shell holder mounted around said intermediate spherical shell, said ring-shaped shell holder having two opposite positioning pins, and two opposite pivot holes which receive the positioning pins of said intermediate spherical shell, the axis which passes through the pivot holes on said ring-shaped shell holder being perpendicular to the axis which passes through the positioning pins of said ring-shaped shell holder;

an outer shell formed of an upper hemispherical shell and a lower hemispherical shell fastened together and fixedly mounted in the circular center hole on said base, said outer shell having a Z-axis zero reference at the center of the upper hemispherical shell thereof, crossed scalings on the upper hemispherical shell thereof, and two opposite pivot holes at the connecting area between the upper hemispherical shell and lower hemispherical shell of said cover shell which receive the positioning pins of said ring-shaped shell holder; and a hollow base covered with a bottom cover, said base having a circular center hole at a top side thereof.

7. The three-dimensional homologous surveying instrument of claim 2 wherein said outer spherical shell, said intermediate spherical shell and said inner spherical shell are transparent; said base comprises a light source and a battery cell electrically connected together and set below said outer spherical shell and controlled to emit light through said outer spherical shell, said intermediate spherical shell and said inner spherical shell.

8. The three-dimensional homologous surveying instrument of claim 1 wherein a battery and a laser beam generating module are electrically connected together and mounted in said inner spherical shell and controlled to emit a laser beam for X-axis zero references, said laser beam generating module having a laser firing hole retained in coincidence with a hole at the zero reference of said inner spherical shell.

9. The three-dimensional homologous surveying instrument of claim 1 which can be achieved by any conventional mechanical arrangement to position an X-axis, a Y-axis and a Z-axis, enabling the zero reference of the X-axis and the zero reference of the Y-axis to be coincide with each other to form a plane and the zero reference of the Z-axis to be moved on the plane such that an angle of slope of X0+Y0+Z5 can be checked through the X-axis.

10. The three-dimensional homologous surveying instrument of claim 2 wherein the zero reference and scalings of said inner spherical shell represent X0° of the X-axis, the zero reference hole and scalings of said intermediate spherical shell represent Y0° of the Y-axis, said inner spherical shell and said intermediate spherical shell being respectively rotated on different axes and concomitantly providing X0°+Y0° plane factors when stand still, enabling the horizontal of X°+Y0°+Z0° and an angle of slope of X°+Y0°+Z5° to be checked through said outer spherical shell (Z-axis).

11. The three-dimensional homologous surveying instrument of claim 2 wherein the zero reference of said outer spherical shell (Z-axis) is on the plane of X°+Y0° obtained from said inner spherical shell and said intermediate spherical shell for a three dimensional surveying through X-axis, Y-axis and Z-axis concomitantly, and the zero reference of said inner spherical shell and the zero reference hole of said intermediate spherical shell being calibrated by rotating the respective counterweight adjustment screws in the respective transverse screw holes.

12. The three-dimensional homologous surveying instrument of claim 1 wherein the method of positioning said inner spherical shell, said intermediate spherical shell, said ring-shaped shell holder and said outer spherical shell is employed to keep a compass constantly in horizontal.

* * * * *